(12) United States Patent
Nakao et al.

(10) Patent No.: US 12,087,924 B2
(45) Date of Patent: Sep. 10, 2024

(54) GAS ADSORPTION SHEET FOR SECONDARY BATTERIES

(71) Applicant: NITTO DENKO CORPORATION, Ibaraki (JP)

(72) Inventors: Kota Nakao, Ibaraki (JP); Daisuke Shimokawa, Ibaraki (JP); Shigeki Kawabe, Ibaraki (JP); Mitsuru Nozue, Tokyo (JP); Minoru Yagi, Tokyo (JP)

(73) Assignee: NITTO DENKO CORPORATION, Osaka (JP)

( * ) Notice: Subject to any disclaimer, the term of this patent is extended or adjusted under 35 U.S.C. 154(b) by 716 days.

(21) Appl. No.: 17/256,730

(22) PCT Filed: Jun. 17, 2019

(86) PCT No.: PCT/JP2019/023917
§ 371 (c)(1),
(2) Date: Dec. 29, 2020

(87) PCT Pub. No.: WO2020/012878
PCT Pub. Date: Jan. 16, 2020

(65) Prior Publication Data
US 2021/0257684 A1  Aug. 19, 2021

(30) Foreign Application Priority Data
Jul. 10, 2018  (JP) ................. 2018-130808

(51) Int. Cl.
*H01M 10/52* (2006.01)
*B01D 53/02* (2006.01)
*H01M 10/0525* (2010.01)

(52) U.S. Cl.
CPC .......... *H01M 10/523* (2013.01); *B01D 53/02* (2013.01); *H01M 10/0525* (2013.01);
(Continued)

(58) Field of Classification Search
None
See application file for complete search history.

(56) References Cited

U.S. PATENT DOCUMENTS 7,776,465 B1  8/2010  Hatazawa et al.
8,795,418 B2  8/2014  Tabata et al.
(Continued)

FOREIGN PATENT DOCUMENTS

CN  102164615 A  8/2011
CN  102858432 A  1/2013
(Continued)

OTHER PUBLICATIONS

Notice of Reasons for Refusal issued Nov. 30, 2021 by the Japanese Patent Office in Japanese Application No. 2018-130808.
(Continued)

*Primary Examiner* — Lucas J. O'Donnell
(74) *Attorney, Agent, or Firm* — Sughrue Mion, PLLC (57) ABSTRACT

Provided is a gas adsorption sheet for a secondary battery, which contains gas adsorbent particles excellent in gas adsorption property, and allows the gas adsorption performance of the gas adsorbent particles to be sufficiently exhibited. According to one embodiment of the present invention, there is provided a gas adsorption sheet for a secondary battery, including: a heat-resistant base material; and a gas adsorption layer arranged on at least one surface of the heat-resistant base material, wherein the gas adsorption layer contains: a binder resin; and gas adsorbent particles each of which is formed of an inorganic porous material having pores, and is capable of adsorbing a gas.

2 Claims, 2 Drawing Sheets

(52) U.S. Cl.
CPC .. *B01D 2253/1085* (2013.01); *B01D 2253/25* (2013.01); *B01D 2253/304* (2013.01); *B01D 2257/204* (2013.01); *B01D 2257/502* (2013.01); *B01D 2257/504* (2013.01); *B01D 2257/80* (2013.01)

(56) References Cited

U.S. PATENT DOCUMENTS

| | | |
|---|---|---|
| 8,864,885 B2 | 10/2014 | Yuasa |
| 10,714,750 B2 | 7/2020 | Tabata et al. |
| 10,756,346 B2 | 8/2020 | Tabata et al. |
| 11,171,386 B2 | 11/2021 | Saeki et al. |
| 11,545,665 B2 | 1/2023 | Tabata et al. |
| 2010/0069507 A1 | 3/2010 | Tabata et al. |
| 2011/0142946 A1 | 6/2011 | Tabata et al. |
| 2012/0270036 A1 | 10/2012 | Kiuchi et al. |
| 2012/0270042 A1 | 10/2012 | Hanai et al. |
| 2013/0089687 A1 | 4/2013 | Tabata et al. |
| 2013/0160652 A1 | 6/2013 | Yuasa |
| 2016/0359139 A1 | 12/2016 | Shintani et al. |
| 2017/0141396 A1 | 5/2017 | Tabata et al. |
| 2019/0252721 A1 | 8/2019 | Nozue et al. |
| 2019/0305278 A1 | 10/2019 | Saeki et al. |
| 2020/0040226 A1 | 2/2020 | Edahiro |
| 2020/0303738 A1 | 9/2020 | Tabata et al. |
| 2020/0313187 A1 | 10/2020 | Tabata et al. |

FOREIGN PATENT DOCUMENTS

| | | |
|---|---|---|
| CN | 103097018 A | 5/2013 |
| CN | 103936003 A | 7/2014 |
| JP | 5-078635 A | 3/1993 |
| JP | 9-132759 A | 5/1997 |
| JP | 2001-155790 A | 6/2001 |
| JP | 2003-1747 A | 1/2003 |
| JP | 2010-267555 A | 11/2010 |
| JP | 2011-206623 A | 10/2011 |
| JP | 2011-206624 A | 10/2011 |
| JP | 2012-059489 A | 3/2012 |
| JP | 2012-226992 A | 11/2012 |
| JP | 2014-203651 A | 10/2014 |
| JP | 2014-232666 A | 12/2014 |
| JP | 2015-162457 A | 9/2015 |
| JP | 2018-100389 A | 6/2018 |
| KR | 10-2015-0108040 A | 9/2015 |
| KR | 10-2016-0037473 A | 4/2016 |
| WO | 2017/204222 A1 | 11/2017 |
| WO | 2018/012485 A1 | 1/2018 |
| WO | 2018/096581 A1 | 5/2018 |
| WO | 2018/101474 A1 | 6/2018 |

OTHER PUBLICATIONS

International Search Report for PCT/JP2019/023917 dated, Aug. 6, 2019 (PCT/ISA/210).

Extended European Search Report dated Mar. 16, 2022 in European Application No. 19834813.8.

Communication dated Feb. 7, 2023, issued in Taiwanese Application No. 108124075.

First Office Action issued Dec. 5, 2023 in Chinese Application No. 201980045903.2.

Second Office Action dated Jun. 13, 2024, issued in Chinese Application No. 201980045903.2.

GAS ADSORPTION SHEET FOR SECONDARY BATTERIES

CROSS REFERENCE TO RELATED APPLICATIONS

This application is a National Stage of International Application No. PCT/JP2019/023917 filed Jun. 17, 2019, claiming priority based on Japanese Patent Application No. 2018-130808 filed Jul. 10, 2018.

TECHNICAL FIELD

The present invention relates to a gas adsorption sheet for a secondary battery.

BACKGROUND ART

Hitherto, a nonaqueous secondary battery typified by a lithium-ion battery or the like has been frequently used in various fields. In the nonaqueous secondary battery using a nonaqueous electrolytic solution, a gas, such as $CO_2$, is liable to be generated through electrolysis of a carbonic acid ester contained in the nonaqueous electrolytic solution, and the generation of the gas may cause, for example, deformation of a housing, an increase in internal resistance, or a reduction in safety.

Various technologies for preventing such problem as described above have been investigated. As one of the technologies, there is a proposal of a gas adsorption material that is formed of a zeolite having pores and is capable of enclosing and adsorbing a gas (Patent Literature 1). The gas adsorption material can exhibit excellent gas adsorption performance, and hence can remarkably improve the safety of the nonaqueous secondary battery. In addition, when the gas adsorption material is used, a degassing step in a production process for the secondary battery can be omitted.

However, the gas adsorption material is provided in a particulate form or a powdery form, and hence has a problem in that its handleability is poor. In addition, owing to the particulate form or the powdery form, the gas adsorption material also has a problem in that it is difficult to arrange a desired amount thereof at a desired site because of, for example, aggregation or unnecessary dispersion.

CITATION LIST

Patent Literature

[PTL 1] JP 2015-162457 A

SUMMARY OF INVENTION

Technical Problem

The present invention has been made in order to solve the problems of the related art described above, and an object of the present invention is to provide a gas adsorption sheet for a secondary battery, which contains gas adsorbent particles excellent in gas adsorption property, and allows the gas adsorption performance of the gas adsorbent particles to be sufficiently exhibited.

Solution to Problem

According to one embodiment of the present invention, there is provided a gas adsorption sheet for a secondary battery, including: a heat-resistant base material; and a gas adsorption layer arranged on at least one surface of the heat-resistant base material, wherein the gas adsorption layer contains: a binder resin; and gas adsorbent particles each of which is formed of an inorganic porous material having pores, and is capable of adsorbing a gas.

In one embodiment, the binder resin is an acrylic resin.

In one embodiment, the acrylic resin contains a constituent unit derived from a (meth)acrylic acid alkyl ester, and the (meth)acrylic acid alkyl ester has a linear or branched alkyl group having 4 to 12 carbon atoms.

In one embodiment, the binder resin is a butyl rubber, an isoprene rubber, a polyisobutylene rubber, an ethylene propylene rubber, or a silicone-based resin.

In one embodiment, a content of the gas adsorbent particles is from 10 parts by weight to 90 parts by weight with respect to 100 parts by weight of the gas adsorption sheet for a secondary battery.

In one embodiment, a material for forming the heat-resistant base material is polyamide imide, polyetherimide, polyphenylene sulfide, polyethylene naphthalate, polyimide, or polyetheretherketone.

Advantageous Effects of Invention

According to the present invention, the gas adsorption material (gas adsorption sheet) excellent in handleability can be obtained by forming the gas adsorbent particles into a sheet in combination with the heat-resistant base material. The gas adsorption sheet allows the original gas adsorption performance of the gas adsorbent particles to be sufficiently exhibited.

BRIEF DESCRIPTION OF DRAWINGS

FIG. 3 ($a$) to FIG. 3($c$) are each a schematic sectional view of a gas adsorption sheet for a secondary battery according to a different embodiment of the present invention.

DESCRIPTION OF EMBODIMENTS

A. Entire Configuration of Gas Adsorption Sheet for Secondary Battery

Figure 1:
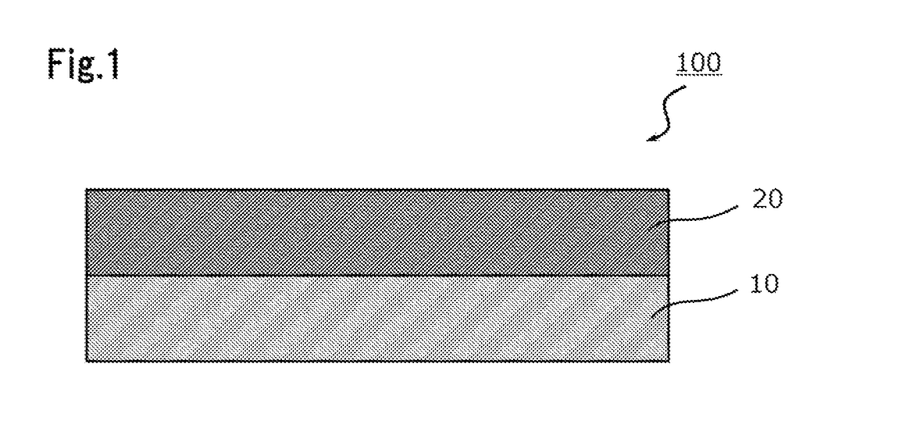
FIG. 1 is a schematic sectional view of a gas adsorption sheet for a secondary battery according to one embodiment of the present invention.
Figure 2:
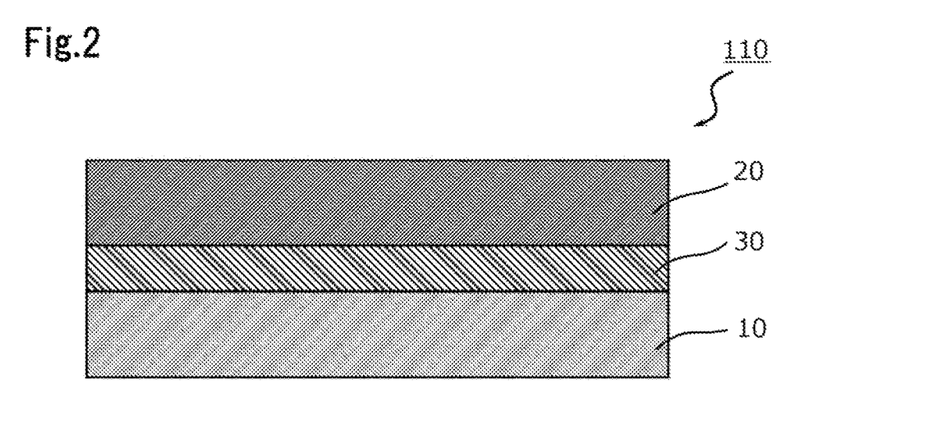
FIG. 2 is a schematic sectional view of a gas adsorption sheet for a secondary battery according to another embodiment of the present invention.

FIG. 1 is a schematic sectional view of a gas adsorption sheet for a secondary battery (hereinafter sometimes referred to simply as gas adsorption sheet) according to one embodiment of the present invention. A gas adsorption sheet 100 includes a heat-resistant base material 10 and a gas adsorption layer 20 arranged on at least one surface of the heat-resistant base material 10. The gas adsorption layer contains a binder resin and gas adsorbent particles. The gas adsorbent particles are each formed of an inorganic porous material having pores. The gas adsorbent particles exhibit high gas adsorption performance by virtue of their enclosing action. As a gas to be adsorbed by each of the gas adsorbent particles, there are given, for example, CO and $CO_2$. In one embodiment, like a gas adsorption sheet 110 illustrated in FIG. 2, the heat-resistant base material 10 and the gas adsorption layer 20 are laminated via a pressure-sensitive adhesive layer 30.

According to the present invention, a sheet is formed by dispersing the gas adsorbent particles in the binder resin and forming the gas adsorption layer containing the gas adsorbent particles and the binder resin. Thus, a gas adsorption sheet that can be applied to various applications with good handleability can be obtained. In addition, the presence of the heat-resistant base material makes the handleability-improving effect more remarkable. Further, the use of the heat-resistant base material as a base material allows the gas adsorption sheet to be heated (for example, heated at 200° C. for 24 hours) before the use of the gas adsorption sheet. When the gas adsorption sheet is heated before its use, unnecessary substances adhering to the gas adsorbent particles can be removed, and at the time of the use, the performance of the gas adsorbent particles can be sufficiently exhibited.

The gas adsorption sheet of the present invention may be suitably used as, for example, a gas adsorption material for a nonaqueous secondary battery. Specifically, the gas adsorption sheet may be used in the form of, for example, an insulating sheet, insulating plate, or insulating tape to be arranged in a nonaqueous electrolytic solution. The gas adsorption sheet of the present invention can adsorb moisture, hydrogen fluoride, and the like as well as CO and $CO_2$, and hence the application of the gas adsorption sheet to a battery can prolong its life. In addition, when a gas adsorption material is provided in the form of a sheet, the gas adsorption material can be applied to a battery with use of existing battery production equipment. Further, the use of the gas adsorption sheet of the present invention makes it easy to arrange a desired amount of the gas adsorbent particles at a desired place.

The $CO_2$ adsorption amount of the gas adsorption sheet of the present invention is preferably 5 mL/g or more, more preferably 15 mL/g or more, still more preferably 20 mL/g or more, still more preferably 30 mL/g or more, particularly preferably 35 mL/g or more, most preferably 40 mL/g or more. The $CO_2$ adsorption amount is preferably as large as possible, but its upper limit is, for example, 80 mL/g. Herein, the $CO_2$ adsorption amount of the gas adsorption sheet means a $CO_2$ adsorption amount per g of the gas adsorption sheet. A measurement method for the $CO_2$ adsorption amount is described later.

The $CO_2$ adsorption amount of the gas adsorption sheet of the present invention is preferably 20% or more, more preferably 30% or more, still more preferably 40% or more with respect to the $CO_2$ adsorption amount of the gas adsorbent particles contained in the gas adsorption sheet. The upper limit of the ratio of the $CO_2$ adsorption amount of the gas adsorption sheet to the $CO_2$ adsorption amount of the gas adsorbent particles is preferably as high as possible, but the upper limit is, for example, 70%, preferably 80%. Herein, the $CO_2$ adsorption amount of the gas adsorbent particles is a $CO_2$ adsorption amount per g of the gas adsorbent particles.

The gas adsorption sheet of the present invention may have a pressure-sensitive adhesive property on one surface or each of both surfaces thereof, or may be a gas adsorption sheet having no pressure-sensitive adhesive property. Examples of the form of the gas adsorption sheet having a pressure-sensitive adhesive property include a form in which the gas adsorption layer has a pressure-sensitive adhesive property, and a form in which a pressure-sensitive adhesive layer is arranged on an outermost side of the gas adsorption sheet (FIG. 3(a) to FIG. 3 (c)).

Figure 3A:
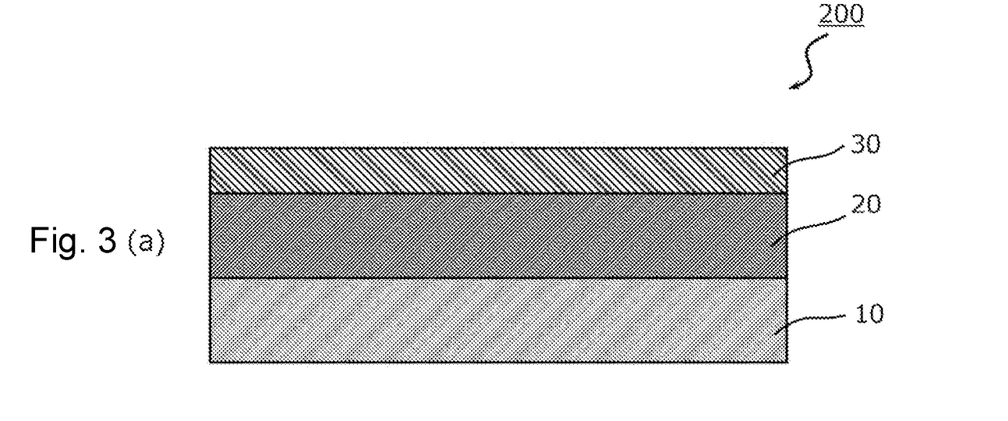
Figure 3B:
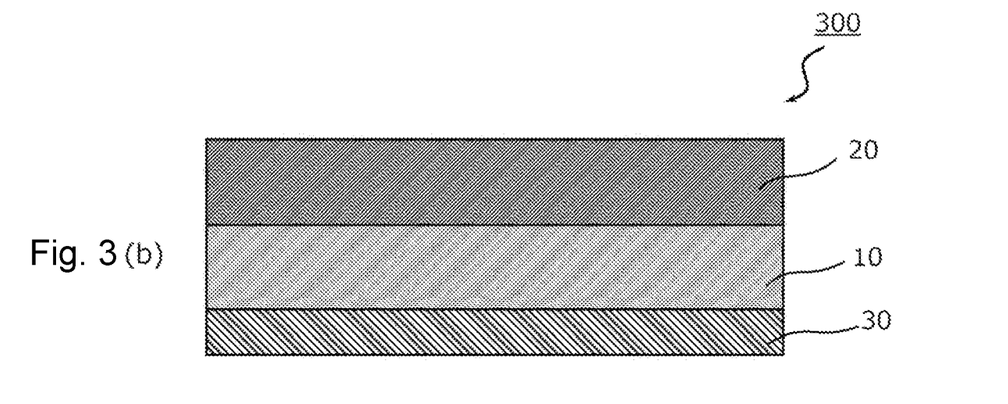
Figure 3C:
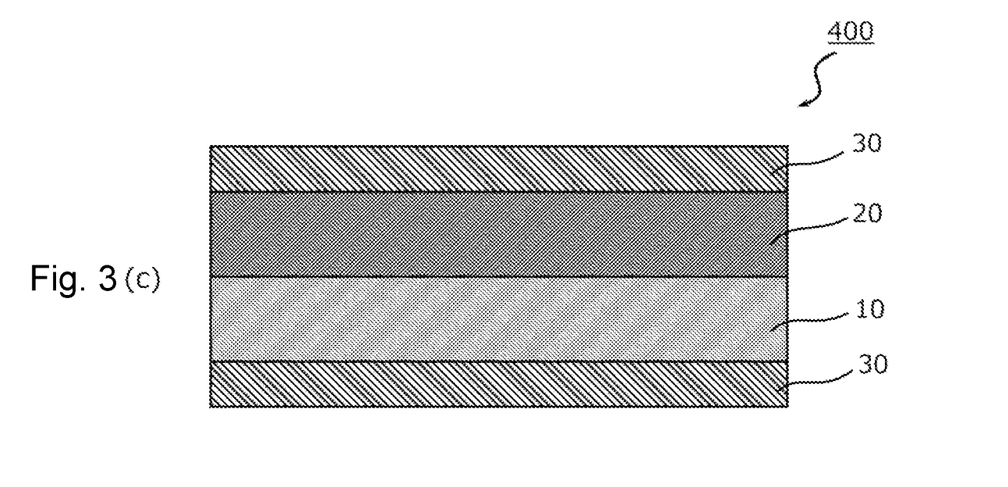

FIG. 3(a) to FIG. 3 (c) are each a schematic sectional view of a gas adsorption sheet according to a different embodiment of the present invention. In each of the gas adsorption sheets illustrated in FIG. 3(a) to FIG. 3(c), the pressure-sensitive adhesive layer 30 is arranged on an outermost side of the gas adsorption sheet. In a gas adsorption sheet 200 illustrated in FIG. 3(a), the pressure-sensitive adhesive layer 30 is arranged on the surface of the gas adsorption layer 20 on the opposite side to the heat-resistant base material 10. In a gas adsorption sheet 300 illustrated in FIG. 3 (b), the pressure-sensitive adhesive layer 30 is arranged on the surface of the heat-resistant base material 10 on the opposite side to the gas adsorption sheet 20. In a gas adsorption sheet 400 illustrated in FIG. 3(c), the pressure-sensitive adhesive layers 30 are arranged on the surface of the gas adsorption 20 on the opposite side to the heat-resistant base material 10, and on the surface of the heat-resistant base material 10 on the opposite side to the gas adsorption layer 20. Also in each of the embodiments illustrated in FIGS. 3, another pressure-sensitive adhesive layer (not shown) may be arranged between the heat-resistant base material and the adsorption layer.

When the gas adsorption sheet of the present invention has a pressure-sensitive adhesive property, the pressure-sensitive adhesive strength of the gas adsorption sheet for a stainless-steel plate at 23° C. is preferably from 0.1 N/20 mm to 10 N/20 mm, more preferably from 0.5 N/20 mm to 5 N/20 mm. When the pressure-sensitive adhesive strength falls within such ranges, the gas adsorption sheet can be made suitable for a battery application. Herein, the pressure-sensitive adhesive strength is a pressure-sensitive adhesive strength measured by a method in conformity with JIS Z 0237:2000, and is measured by bonding a pressure-sensitive adhesive tape to an adherend (SUS304BA) by one pass back and forth with a 2 kg roller, leaving the resultant to stand under 23°C for 30 minutes, and then peeling off the pressure-sensitive adhesive tape under the conditions of a peel angle of 180° and a peel rate (tensile rate) of 300 mm/min.

The thickness of the gas adsorption sheet of the present invention is preferably from 10 μm to 1,000 μm, more preferably from 20 μm to 500 μm, still more preferably from 20 μm to 150 μm, still more preferably from 20 μm to 120 μm, particularly preferably from 20 μm to 110 μm. When the thickness falls within such ranges, a gas adsorption sheet excellent in gas adsorption performance and handleability can be obtained.

B. Gas Adsorption Layer

As described above, the gas adsorption layer contains the binder resin and the gas adsorbent particles present in a dispersed state in the binder resin. In the present invention, by virtue of adopting such form, the gas adsorption layer can be formed by application through use of an application liquid containing the binder resin and the gas adsorbent particles. As a result, a gas adsorption layer excellent in dispersibility of the gas adsorbent particles can be formed, and hence a gas adsorption sheet excellent in gas adsorption performance can be obtained.

The thickness of the gas adsorption layer is preferably from 5 μm to 150 μm, more preferably from 5 μm to 100 μm, still more preferably from 10 μm to 80 μm. When the thickness falls within such ranges, the gas adsorption layer can be made capable of sufficiently exhibiting the performance of the gas adsorbent particles. In addition, a gas adsorption sheet excellent in handleability can be obtained.

B-1. Gas Adsorbent Particles

The gas adsorbent particles are each formed of an inorganic porous material having pores. In one embodiment, the gas adsorbent particles are each formed of a zeolite. The zeolite may be an A-type zeolite, an X-type zeolite, or an LSX-type zeolite. The zeolite is preferably an A-type zeolite in which the cationic moiety of the zeolite is ion-exchanged with Li, or an A-type zeolite in which the cationic moiety of the zeolite is ion-exchanged with Ca. The ratio (Si/Al) of Si and Al contained in each of the gas adsorbent particles is preferably from 1 to 5. When Si/Al is less than 1, there is a risk in that the gas adsorbent particles may be structurally unstable. In addition, when Si/Al is more than 5, there is a risk in that the adsorption performance may be reduced.

The number-average primary particle diameter of the gas adsorbent particles is preferably 10 μm or less. When the number-average primary particle diameter falls within such range, a gas adsorption layer having a large gas adsorption amount can be formed. The number-average primary particle diameter may be measured with a laser diffraction/scattering particle diameter distribution-measuring apparatus.

The specific surface area of the gas adsorbent particles is preferably from 100 $m^2/g$ to 3,000 $m^2/g$. When the specific surface area falls within such range, gas adsorbent particles excellent in gas adsorption performance and mechanical strength can be obtained. gas adsorbent particles having a large specific surface area as just described are liable to aggregate, but according to the invention of the present application, the gas adsorption layer can be formed with good dispersibility of the gas adsorbent particles.

The gas adsorbent particles have pores. The size of each of the pores is preferably from 3 Å to 10 Å. The pores are preferably present over the entire surfaces of the gas adsorbent particles.

The $CO_2$ adsorption amount of the gas adsorbent particles is preferably 15 mL/g or more, more preferably 20 mL/g or more, still more preferably 30 mL/g or more.

The content of the gas adsorbent particles is preferably from 10 parts by weight to 90 parts by weight, more preferably from 30 parts by weight to 80 parts by weight, still more preferably from 40 parts by weight to 70 parts by weight with respect to 100 parts by weight of the gas adsorption sheet. When the content falls within such ranges, a gas adsorption sheet excellent in gas adsorption performance and excellent in handleability can be obtained.

The content of the gas adsorbent particles is preferably from 10 parts by weight to 2,000 parts by weight, more preferably from 50 parts by weight to 1,500 parts by weight, still more preferably from 100 parts by weight to 1,000 parts by weight, particularly preferably from 280 parts by weight to 1,000 parts by weight with respect to 100 parts by weight of the binder resin contained in the gas adsorption layer. When the content falls within such ranges, a gas adsorption layer from which the gas adsorbent particles are hardly detached can be obtained. In addition, a gas adsorption sheet excellent in gas adsorption performance, handleability, and electrolytic solution resistance can be obtained.

B-2. Binder Resin

Any appropriate resin may be used as the binder resin as long as the effect of the present invention is obtained. Examples of the binder resin include: an acrylic resin; a rubber-based resin, such as a butyl rubber, an isoprene rubber, a polyisobutylene rubber, or an ethylene propylene rubber; a silicone-based resin; a urethane-based resin; an epoxy-based resin; an alkyd-based resin; a polyester-based resin; a melamine-based resin; a polyamide-based resin; a polyimide-based resin; an ethylene-vinyl acetate copolymer resin; and a polyvinyl alcohol-based resin. In one embodiment, an acrylic resin, a butyl rubber, or a silicone-based resin is preferably used. When any such resin is used, a gas adsorption layer excellent in dispersibility of the gas adsorbent particles can be formed.

The binder resin preferably has a gas permeation property. When the binder resin having a gas permeation property is used, a gas adsorption sheet suitable for a battery application can be obtained. Examples of the resin excellent in gas permeation property include: an acrylic resin; a rubber-based resin, such as a butyl rubber, an isoprene rubber, a polyisobutylene rubber, or an ethylene propylene rubber; a silicone-based resin; a urethane-based resin; an epoxy-based resin; an alkyd-based resin; a polyester-based resin; a melamine-based resin; a polyamide-based resin; and a polyimide-based resin. The $CO_2$ permeability of the gas adsorption layer is preferably 1,500 $cm^3/m^2 \cdot 24$ hrs·atm or more, more preferably 3,000 $cm^3/m^2 \cdot 24$ hrs·atm or more. The $CO_2$ permeation amount of the gas adsorption layer may be measured by JIS K7126 (equal-pressure method) under an environment having a temperature of 23° C.

The binder resin preferably shows high affinity for a nonaqueous electrolytic solution. An example of such binder resin is a resin having an SP value of from 8 $cal/cm^3$ to 15.4 $cal/cm^3$ (preferably from 9 $cal/cm^3$ to 13.2 $cal/cm^3$). In addition, the binder resin preferably has high electrolytic solution resistance against the nonaqueous electrolytic solution.

In one embodiment, an acrylic resin is used as the binder resin. When the acrylic resin is used, a gas adsorption layer from which the gas adsorbent particles are hardly detached can be formed. In addition, a gas adsorption layer that allows the gas adsorption performance of the gas adsorbent particles to be sufficiently exhibited can be formed.

The acrylic resin is, for example, an acrylic resin containing one or two or more kinds of constituent units each derived from a (meth)acrylic acid alkyl ester. The content of the constituent unit derived from the (meth)acrylic acid alkyl ester is preferably from 50 parts by weight to 97 parts by weight, more preferably from 70 parts by weight to 94 parts by weight with respect to 100 parts by weight of the acrylic resin.

The (meth)acrylic acid alkyl ester preferably has a linear or branched alkyl group having 1 to 24 (more preferably 3 to 20, still more preferably 6 to 18) carbon atoms.

In one embodiment, the (meth)acrylic acid alkyl ester has preferably a linear or branched alkyl group having 4 to 12 carbon atoms, more preferably a linear or branched alkyl group having 6 to 12 carbon atoms. When the gas adsorption layer is formed using an acrylic resin having such (meth)acrylic acid alkyl ester as a main constituent unit, a gas adsorption sheet whose discoloration and swelling in an electrolytic solution are suppressed can be obtained.

Examples of the (meth)acrylic acid alkyl ester include methyl (meth)acrylate, ethyl (meth)acrylate, propyl (meth)acrylate, butyl (meth)acrylate, pentyl (meth)acrylate, hexyl (meth)acrylate, heptyl (meth)acrylate, octyl (meth)acrylate, nonyl (meth)acrylate, decyl (meth)acrylate, and eicosyl (meth)acrylate.

In one embodiment, a (meth)acrylic acid alkyl ester having a branched alkyl group is used as the (meth)acrylic acid alkyl ester. When the (meth)acrylic acid alkyl ester having a branched alkyl group is used, a gas adsorption layer that allows the gas adsorption performance of the gas adsorbent particles to be sufficiently exhibited can be formed. The (meth)acrylic acid alkyl ester having a linear alkyl group and the (meth)acrylic acid alkyl ester having a branched alkyl group may also be used in combination. In addition, the (meth)acrylic acid alkyl ester having a branched alkyl group may be used alone as the (meth)acrylic acid alkyl ester.

In one embodiment, the content of a constituent unit derived from the (meth)acrylic acid alkyl ester having a branched alkyl group in the acrylic resin is preferably from 20 parts by weight to 100 parts by weight, more preferably from 30 parts by weight to 100 parts by weight, still more preferably from 50 parts by weight to 100 parts by weight, particularly preferably from 70 parts by weight to 100 parts by weight with respect to 100 parts by weight of the constituent unit derived from the (meth)acrylic acid alkyl ester (i.e., a total amount of 100 parts by weight of the (meth)acrylic acid alkyl ester having a linear alkyl group (including methyl (meth)acrylate and ethyl (meth)acrylate) and the (meth)acrylic acid alkyl ester having a branched alkyl group). When the content falls within such ranges, a gas adsorption sheet particularly excellent in electrolytic solution resistance can be obtained.

Examples of the (meth)acrylic acid alkyl ester having a branched alkyl group include isobutyl (meth)acrylate, s-butyl (meth)acrylate, t-butyl (meth)acrylate, 2-ethylhexyl (meth)acrylate, isooctyl (meth)acrylate, isononyl (meth)acrylate, isodecyl (meth)acrylate, stearyl (meth)acrylate, 2-ethylbutyl (meth)acrylate, and 2-methylbutyl (meth)acrylate. Of those, 2-ethylhexyl (meth)acrylate is more preferred.

The acrylic resin may contain a constituent unit derived from another monomer copolymerizable with the (meth)acrylic acid alkyl ester as required for the purpose of modifying cohesive strength, heat resistance, cross-linkability, or the like. Examples of such other monomer include: carboxyl group-containing monomers, such as (meth)acrylic acid, carboxyethyl acrylate, carboxypentyl acrylate, itaconic acid, maleic acid, fumaric acid, and crotonic acid; acid anhydride group-containing monomers, such as maleic anhydride and itaconic anhydride; phosphoric acid group-containing monomers, such as 2-hydroxyethylacryloyl phosphate; sulfonic acid group-containing monomers, such as styrenesulfonic acid, allylsulfonic acid, 2-(meth)acrylamido-2-methylpropanesulfonic acid, (meth)acrylamidopropanesulfonic acid, sulfopropyl (meth)acrylate, and (meth)acryloyloxynaphthalenesulfonic acid; hydroxyl group-containing monomers, such as hydroxyethyl (meth)acrylate, hydroxypropyl (meth)acrylate, hydroxybutyl (meth)acrylate, hydroxyhexyl (meth)acrylate, hydroxyoctyl (meth)acrylate, hydroxydecyl (meth)acrylate, hydroxylauryl (meth)acrylate, and (4-hydroxymethylcyclohexyl) methyl methacrylate; (N-substituted) amide-based monomers, such as (meth)acrylamide, N, N-dimethyl (meth)acrylamide, N-butyl (meth)acrylamide, N-methylol (meth)acrylamide, and N-methylolpropane (meth)acrylamide; aminoalkyl (meth)acrylate-based monomers, such as aminoethyl (meth)acrylate, N, N-dimethylaminoethyl (meth)acrylate, and t-butylaminoethyl (meth)acrylate; alkoxyalkyl (meth)acrylate-based monomers, such as methoxyethyl (meth)acrylate and ethoxyethyl (meth)acrylate; maleimide-based monomers, such as N-cyclohexylmaleimide, N-isopropylmaleimide, N-laurylmaleimide, and N-phenylmaleimide;

itaconimide-based monomers, such as N-methylitaconimide, N-ethylitaconimide, N-butylitaconimide, N-octylitaconimide, N-2-ethylhexylitaconimide, N-cyclohexylitaconimide, and N-laurylitaconimide; succinimide-based monomers, such as N-(meth)acryloyloxymethylenesuccinimide, N-(meth)acryloyl-6-oxyhexamethylenesuccinimide, and N-(meth)acryloyl-8-oxyoctamethylenesuccinimide; vinyl-based monomers, such as vinyl acetate, vinyl propionate, N-vinylpyrrolidone, methylvinylpyrrolidone, vinylpyridine, vinylpiperidone, vinylpyrimidine, vinylpiperazine, vinylpyrazine, vinylpyrrole, vinylimidazole, vinyloxazole, vinylmorpholine, N-vinylcarboxylic acid amides, styrene, α-methylstyrene, and N-vinylcaprolactam; cyanoacrylate monomers, such as acrylonitrile and methacrylonitrile; epoxy group-containing acrylic monomers, such as glycidyl (meth)acrylate; glycol-based acrylic ester monomers, such as polyethylene glycol (meth)acrylate, polypropylene glycol (meth)acrylate, methoxyethylene glycol (meth)acrylate, and methoxypolypropylene glycol (meth) acrylate; acrylic acid ester-based monomers each having a heterocycle, a halogen atom, or a silicon atom, such as tetrahydrofurfuryl (meth)acrylate, fluorinated (meth)acrylate, and silicone (meth)acrylate; polyfunctional monomers, such as hexanediol di (meth)acrylate, (poly) ethylene glycol di (meth)acrylate, (poly) propylene glycol di (meth)acrylate, neopentyl glycol di (meth)acrylate, pentaerythritol di (meth) acrylate, trimethylolpropane tri (meth)acrylate, pentaerythritol tri (meth)acrylate, dipentaerythritol hexa (meth)acrylate, epoxy acrylate, polyester acrylate, and urethane acrylate; olefin-based monomers, such as isoprene, butadiene, and isobutylene; and vinyl ether-based monomers, such as vinyl ether. Those monomer components may be used alone or in combination thereof.

The content of the constituent unit derived from the other monomer is preferably 20 parts by weight or less, more preferably 15 parts by weight or less, still more preferably from 1 part by weight to 10 parts by weight with respect to 100 parts by weight of the acrylic resin.

The weight-average molecular weight of the acrylic resin is preferably from 300,000 to 2,000,000, more preferably from 500,000 to 1,500,000. The weight-average molecular weight may be measured by GPC (solvent: THE).

C. Heat-Resistant Base Material

Herein, the heat-resistant base material means a base material capable of withstanding heating under an atmosphere having a temperature of 150° C. and a pressure of from −100 kPa to 0 kPa for 24 hours (preferably under an atmosphere having a temperature of 200° ° C. and a pressure of from −100 kPa to 0 kPa for 24 hours), specifically a base material having a dimensional change of 5% or less even when heated under an atmosphere having a temperature of 150° C. and a pressure of −100 kPa for 24 hours (preferably under an atmosphere having a temperature of 200° C. and a pressure of −100 kPa for 24 hours). In addition, when the heat-resistant base material is formed of a resin, the heat-resistant base material means a base material formed of a resin having a glass transition temperature of 80° C. or more (preferably 100° C. or more, more preferably 150° C. or more). The term "glass transition temperature" means a temperature at which the resin shows the peak of a loss tangent (tan δ) found under the conditions of a temperature increase rate of 5° C./min, a sample width of 5 mm, a chuck-to-chuck distance of 20 mm, and a frequency of 10 Hz in a DMA method (tensile method).

Any appropriate material may be adopted as a material for forming the heat-resistant base material as long as the effect of the present invention is obtained. The heat-resistant base material is preferably formed of a resin. Examples of the material for forming the heat-resistant base material include polyamide imide (PAI), polyetherimide (PEI), polyphenylene sulfide (PPS), polyethylene naphthalate (PEN), polyimide (PI), and polyetheretherketone (PEEK). Those e resins are each excellent in heat resistance and excellent in electrolytic solution resistance.

The thickness of the heat-resistant base material is preferably from 5 µm to 500 µm, more preferably from 10 µm to 300 µm, still more preferably from 15 µm to 100 µm. When the thickness falls within such ranges, a gas adsorption sheet particularly excellent in handleability can be obtained.

D. Pressure-Sensitive Adhesive Layer

The pressure-sensitive adhesive layer is formed of any appropriate pressure-sensitive adhesive. Examples of the pressure-sensitive adhesive for forming the pressure-sensitive adhesive layer include an acrylic pressure-sensitive adhesive, a rubber-based pressure-sensitive adhesive, a silicone-based pressure-sensitive adhesive, and a urethane-based pressure-sensitive adhesive. Of those, an acrylic pressure-sensitive adhesive or a rubber-based pressure-sensitive adhesive (preferably an isobutylene-isoprene rubber-based pressure-sensitive adhesive or a polyisobutylene rubber-based pressure-sensitive adhesive) is preferred from the viewpoint of electrolytic solution resistance.

The pressure-sensitive adhesive layer may contain any appropriate additive as required. Examples of the additive include a cross-linking agent, a tackifier, a plasticizer (e.g., a trimellitic acid ester-based plasticizer or a pyromellitic acid ester-based plasticizer), a pigment, a dye, a filler, an age resistor, a conductive agent, a UV absorber, a light stabilizer, a release modifier, a softener, a surfactant, a flame retardant, an antioxidant, and a solvent.

The thickness of the pressure-sensitive adhesive layer is preferably from 1 µm to 100 µm, more preferably from 3 µm to 50 µm, still more preferably from 5 µm to 20 µm.

E. Production Method for Gas Adsorption Sheet

The gas adsorption sheet may be produced by any appropriate method. In one embodiment, the gas adsorption sheet is produced by applying a composition for gas adsorption layer formation containing the binder resin and the gas adsorbent particles onto the heat-resistant base material, and by drying the composition. When the gas adsorption layer is formed by application, a gas adsorption sheet excellent in dispersibility of the gas adsorbent particles and excellent in gas adsorption performance can be obtained.

The composition for gas adsorption layer formation may further contain any appropriate additive in addition to the binder resin and the gas adsorbent particles. Examples of the additive include a cross-linking agent, a tackifier, a plasticizer (e.g., a trimellitic acid ester-based plasticizer or a pyromellitic acid ester-based plasticizer), a pigment, a dye, a filler, an age resistor, a conductive agent, a UV absorber, a light stabilizer, a release modifier, a softener, a surfactant, a flame retardant, and an antioxidant. Examples of the cross-linking agent include an isocyanate-based cross-linking agent, an epoxy-based cross-linking agent, a melamine-based cross-linking agent, and a peroxide-based cross-linking agent. In addition to the foregoing, the examples further include a urea-based cross-linking agent, a metal alkoxide-based cross-linking agent, a metal chelate-based cross-linking agent, a metal salt-based cross-linking agent, a carbodiimide-based cross-linking agent, an oxazoline-based cross-linking agent, an aziridine-based cross-linking agent, and an amine-based cross-linking agent. Of those, an isocyanate-based cross-linking agent or an epoxy-based cross-linking agent is preferred. In addition, the composition for gas adsorption layer formation may contain a solvent, such as toluene or ethyl acetate.

Examples of an application method for the composition for gas adsorption layer formation include: coating methods, such as air doctor coating, blade coating, knife coating, reverse coating, transfer roll coating, gravure roll coating, kiss coating, cast coating, spray coating, slot orifice coating, calender coating, electrodeposition coating, dip coating, and die coating; and printing methods, such as a relief printing method, for example, flexo printing, an intaglio printing method, for example, a direct gravure printing method or an offset gravure printing method, a planographic printing method, for example, an offset printing method, and a stencil printing method, for example, a screen printing method.

EXAMPLES

Now, the present invention is specifically described by way of Examples. However, the present invention is by no means limited to these Examples. Evaluation methods in Examples are as described below. In addition, in Examples, the terms "part (s)" and "%" are by weight unless otherwise stated.

(1) Gas Adsorption Amount Evaluation

Under an environment having a dew point of −40° C., a gas adsorption sheet prepared in each of Examples, Comparative Examples, and Reference Example was immersed in an electrolytic solution for a lithium-ion battery (composition:lithium hexafluorophosphate (1 mol/l) ethylene carbonate solution/ethyl methyl carbonate=3/7 (volume ratio)) in a predetermined sealed glass container containing 80 ml/g of the electrolytic solution per g of the gas adsorption sheet, and the glass container was stored at 60° ° C. for 24 hours.

After that, a $CO_2$ concentration A in the glass container was measured by gas chromatography.

In the same manner as described above except that no gas adsorption sheet was placed in the glass container, that is, under a state in which only the electrolytic solution for a lithium-ion battery was enclosed in the glass container, the glass container was stored at 60° ° C. for 24 hours, and then a $CO_2$ concentration B in the glass container was measured and found to be 0.43 v/v %.

On the basis of a difference between the $CO_2$ concentration A and the $CO_2$ concentration B, the gas adsorption amount of the gas adsorption sheet (gas adsorption amount per g of the gas adsorption sheet (mL/g)) was evaluated.

(2) Handleability

The gas adsorption sheet prepared in each of Examples and Comparative Examples was cut to have a width of 10 mm and set to a tensile tester at a chuck-to-chuck distance of 10 mm, and its tensile strength was measured by performing a tensile test at a tensile rate of 300 mm/min.

Evaluation criteria for handleability were set as described below, and acceptability was determined.

Acceptable (○): The tensile strength is 10.0 (N/10 mm) or more.

Unacceptable (x): The tensile strength is less than 10.0 (N/10 mm).

(3) Heat Resistance

The gas adsorption sheet prepared in each of Examples and Comparative Examples was vacuum-dried under an environment at 200° ° C. for 24 hours, and its dimensions (length and breadth of the sheet) were measured before and after the drying. The change ratio of the size was calculated by the following equation.

Change ratio [%]=(dimension after drying)/(dimension before drying)×100

Evaluation criteria for heat resistance were set as described below, and acceptability was determined.

Acceptable (o): The change ratio of each of the length and the breadth is 100±5%.

Unacceptable (x): The change ratio falls outside the above-mentioned range.

(4) Electrolytic Solution Resistance

The gas adsorption sheet prepared in each of Examples and Comparative Examples was immersed in an electrolytic solution (EC:EMC=3:7+LiPF$_6$ (1 mol)) under an environment at 60° ° C. for 24 h. After the immersion, a swelling ratio was measured, and external appearance was observed. In addition, the gas adsorption sheet was washed with water and dried, and then external appearance was observed again.

Evaluation criteria for electrolytic solution resistance were set as described below, and acceptability was determined.

Acceptable (○): The swelling ratio is less than 100%, and no change in external appearance is found.

Unacceptable (x): The swelling ratio is 100% or more, or an abnormality in external appearance is found.

Swelling ratio (%) . . . (weight after electrolytic solution immersion-weight before electrolytic solution immersion)/weight before electrolytic solution immersion×100 External appearance . . . visual observation of gas adsorption sheet before and after electrolytic solution immersion for the presence or absence of discoloration or detachment (5) Gas Permeability Only the binder components (resin composition+cross-linking agent) of a gas adsorption layer used in each of Examples and Comparative Examples were applied onto a PET film having a thickness of 2 μm so as to have the same thickness as the gas adsorption layer of each of Examples and Comparative Examples to form an evaluation layer. The evaluation layer was subjected to the measurement of the carbonic acid gas permeability of the binders at 23° C., and the resultant measured value was evaluated as the permeability of the gas adsorption layer.

Measurement apparatus: differential pressure-type gas/vapor permeability-measuring apparatus (GTR-30XAD, G6800•F(S) manufactured by GTR TEC Corporation/Yanaco Technical Science Corp.)

Example 1

A four-necked flask with a stirring blade, a temperature gauge, a nitrogen gas inlet tube, and a condenser was loaded with 2-ethylhexyl acrylate/ethyl acrylate/methyl methacrylate/hydroxyethyl acrylate (30 parts by weight/70 parts by weight/5 parts by weight/4 parts by weight), 0.2 part by weight of benzoyl peroxide serving as an initiator, and 244 parts by weight of toluene. While the contents were gently stirred, a nitrogen gas was introduced, and a polymerization reaction was performed for about 6 hours with the liquid temperature in the flask being kept around 60° C. to provide a resin composition (1) containing an acrylic copolymer (1).

To the resin composition (1) containing 100 parts by weight of the acrylic copolymer (1), 2 parts by weight of an isocyanate-based cross-linking agent (manufactured by Nippon Polyurethane Industry Co., Ltd., product name: "Coronate L"), ethyl acetate, and 900 parts by weight of gas adsorbent particles (Ca-ion-exchanged A-type zeolite, number-average primary particle diameter: 10 μm or less) were added to prepare a 50%-base composition (1) for gas adsorption layer formation.

The resultant composition (1) for gas adsorption layer formation was applied onto a polyimide film (manufactured by Du Pont-Toray Co., Ltd., product name: "Kapton 100H", thickness: 25 μm) serving as a heat-resistant base material so as to have a thickness of 80 μm after drying. Thus, a gas adsorption sheet (1) was obtained.

The resultant gas adsorption sheet (1) was dried under a reduced pressure of −100 kPa at 200° ° C. for 24 hours, and then subjected to the evaluations (1) to (5). The results are shown in Table 1.

Example 2

A four-necked flask with a stirring blade, a temperature gauge, a nitrogen gas inlet tube, and a condenser was loaded with 2-ethylhexyl acrylate/acrylic acid (100 parts by weight/5 parts by weight), 0.2 part by weight of benzoyl peroxide serving as an initiator, and 120 parts by weight of ethyl acetate. While the contents were gently stirred, a nitrogen gas was introduced, and a polymerization reaction was performed for about 6 hours with the liquid temperature in the flask being kept around 60° ° C. to provide a resin composition (2) containing an acrylic copolymer (2).

To the resin composition (2) containing 100 parts by weight of the acrylic copolymer (2), 2 parts by weight of an isocyanate-based cross-linking agent (manufactured by Nippon Polyurethane Industry Co., Ltd., product name: "Coronate L") and ethyl acetate were added to prepare a 20%-base pressure-sensitive adhesive composition (1).

The pressure-sensitive adhesive composition (1) was applied to the opposite surface of the gas adsorption sheet (1) to the gas adsorption layer so as to have a thickness of 10 μm after drying. Thus, a gas adsorption sheet (2) including a pressure-sensitive adhesive layer, a heat-resistant base material, and a gas adsorption layer in the stated order was obtained.

The resultant gas adsorption sheet (2) was dried under a reduced pressure of −100 kPa at 200° C. for 24 hours, and then subjected to the evaluations (1) to (5). The results are shown in Table 1.

Example 3

A gas adsorption sheet (3) was obtained in the same manner as in Example 1 except that the blending amount of the gas adsorbent particles was changed to 250 parts by weight.

The resultant gas adsorption sheet (3) was dried under a reduced pressure of −100 kPa at 200° C. for 24 hours, and then subjected to the evaluations (1) to (5). The results are shown in Table 1.

Example 4

A four-necked flask with a stirring blade, a temperature gauge, a nitrogen gas inlet tube, and a condenser was loaded with 2-ethylhexyl acrylate/hydroxyethyl acrylate (100 parts by weight/4 parts by weight), 0.2 part by weight of azobisisobutyronitrile serving as an initiator, and 180 parts by weight of ethyl acetate. While the contents were gently stirred, a nitrogen gas was introduced, and a polymerization reaction was performed for about 6 hours with the liquid temperature in the flask being kept around 60° C. to provide a resin composition (3) containing an acrylic copolymer (3).

To the resin composition (3) containing 100 parts by weight of the acrylic copolymer (3), 2 parts by weight of an isocyanate-based cross-linking agent (manufactured by Nippon Polyurethane Industry Co., Ltd., product name: "Coronate L"), ethyl acetate, and 900 parts by weight of gas adsorbent particles (Ca-ion-exchanged A-type zeolite, number-average primary particle diameter: 10 μm or less) were added to prepare a composition (2) for gas adsorption layer formation.

A gas adsorption sheet (4) was obtained in the same manner as in Example 1 except that the composition (2) for gas adsorption layer formation was used.

The resultant gas adsorption sheet (4) was dried under a reduced pressure of −100 kPa at 200° C. for 24 hours, and then subjected to the evaluations (1) to (5). The results are shown in Table 1.

Example 5

A gas adsorption sheet (5) was obtained in the same manner as in Example 4 except that the blending amount of the gas adsorbent particles was changed to 250 parts by weight.

The resultant gas adsorption sheet (5) was dried under a reduced pressure of −100 kPa at 200° C. for 24 hours, and then subjected to the evaluations (1) to (5). The results are shown in Table 1.

Example 6

A gas adsorption sheet (6) was obtained in the same manner as in Example 4 except that the thickness of the gas adsorption layer after drying was changed to 120 µm.

The resultant gas adsorption sheet (6) was dried under a reduced pressure of −100 kPa at 200° ° C. for 24 hours, and then subjected to the evaluations (1) to (5). The results are shown in Table 1.

Example 7

A gas adsorption sheet (7) was obtained in the same manner as in Example 6 except that a polyimide film (manufactured by Du Pont-Toray Co., Ltd., product name: "Kapton 100H", thickness: 12 µm) was used as the heat-resistant base material.

The resultant gas adsorption sheet (7) was dried under a reduced pressure of −100 kPa at 200° ° C. for 24 hours, and then subjected to the evaluations (1) to (5). The results are shown in Table 1.

Example 8

The resin composition (2) containing the acrylic copolymer (2) was obtained in the same manner as in Example 2.

To the resin composition (2) containing 100 parts by weight of the acrylic copolymer (2), 0.5 part by weight of an epoxy-based cross-linking agent (manufactured by Mitsubishi Gas Chemical Company, product name: "TETRAD-C"), ethyl acetate, and 250 parts by weight of gas adsorbent particles (Ca-ion-exchanged A-type zeolite, number-average primary particle diameter: 10 µm or less) were added to prepare a 50%-base composition (3) for gas adsorption layer formation.

The resultant composition (3) for gas adsorption layer formation was applied onto a polyimide film (manufactured by Du Pont-Toray Co., Ltd., product name: "Kapton 100H", thickness: 25 µm) serving as a heat-resistant base material so as to have a thickness of 80 µm after drying. Thus, a gas adsorption sheet (8) was obtained.

The resultant gas adsorption sheet (8) was dried under a reduced pressure of −100 kPa at 200° C. for 24 hours, and then subjected to the evaluations (1) to (5). The results are shown in Table 1.

Example 9

To the resin composition (4) containing 100 parts by weight of polyisobutylene (manufactured by BASF Japan Co., Ltd., product name: "OPPANOL B 80"), toluene and 900 parts by weight of gas adsorbent particles (Ca-ion-exchanged A-type zeolite, number-average primary particle diameter: 10 µm or less) were added to prepare a 50%-base composition (4) for gas adsorption layer formation.

The resultant composition (4) for gas adsorption layer formation was applied onto a polyimide film (manufactured by Du Pont-Toray Co., Ltd., product name: "Kapton 100H", thickness: 25 µm) serving as a heat-resistant base material so as to have a thickness of 80 µm after drying. Thus, a gas adsorption sheet (9) was obtained.

The resultant gas adsorption sheet (9) was dried under a reduced pressure of −100 kPa at 200° C. for 24 hours, and then subjected to the evaluations (1) to (5). The results are shown in Table 1.

Example 10

A gas adsorption sheet (10) was obtained in the same manner as in Example 9 except that the blending amount of the gas adsorbent particles was changed to 250 parts by weight.

The resultant gas adsorption sheet (10) was dried under a reduced pressure of −100 kPa at 200° ° C. for 24 hours, and then subjected to the evaluations (1) to (5). The results are shown in Table 1.

Example 11

A gas adsorption sheet (11) was obtained in the same manner as in Example 4 except that the blending amount of the gas adsorbent particles was changed to 10 parts by weight.

The resultant gas adsorption sheet (11) was dried under a reduced pressure of −100 kPa at 200° ° C. for 24 hours, and then subjected to the evaluations (1) to (5). The results are shown in Table 1.

Example 12

A gas adsorption sheet (12) was obtained in the same manner as in Example 4 except that the blending amount of the gas adsorbent particles was changed to 2,000 parts by weight.

The resultant gas adsorption sheet (12) was dried under a reduced pressure of −100 kPa at 200° ° C. for 24 hours, and then subjected to the evaluations (1) to (5). The results are shown in Table 1.

Example 13

A four-necked flask with a stirring blade, a temperature gauge, a nitrogen gas inlet tube, and a condenser was loaded with butyl acrylate/acrylic acid (95 parts by weight/5 parts by weight), 0.2 part by weight of benzoyl peroxide serving as an initiator, and 244 parts by weight of toluene. While the contents were gently stirred, a nitrogen gas was introduced, and a polymerization reaction was performed for about 6 hours with the liquid temperature in the flask being kept around 60° C. to provide a resin composition (5) containing an acrylic copolymer (4).

To the resin composition (5) containing 100 parts by weight of the acrylic copolymer (4), 1 part by weight of an isocyanate-based cross-linking agent (manufactured by Nippon Polyurethane Industry Co., Ltd., product name: "Coronate L"), ethyl acetate, and 250 parts by weight of gas adsorbent particles: Ca-ion-exchanged A-type zeolite (particle diameter: 10 μm or less) were added to prepare a 50%-base composition (5) for gas adsorption layer formation.

The resultant composition (5) for gas adsorption layer formation was applied onto a polyimide film (manufactured by Du Pont-Toray Co., Ltd., product name: "Kapton 100H", thickness: 25 μm) serving as a heat-resistant base material so as to have a thickness of 80 μm after drying. Thus, a gas adsorption sheet (13) was obtained.

The resultant gas adsorption sheet (13) was dried under a reduced pressure of −100 kPa at 200° ° C. for 24 hours, and then subjected to the evaluations (1) to (5). The results are shown in Table 1.

Comparative Example 1

The resin composition (1) containing the acrylic copolymer (1) was obtained in the same manner as in Example 1. To the resin composition (1) containing 100 parts by weight of the acrylic copolymer (1), 2 parts by weight of an isocyanate-based cross-linking agent (manufactured by Nippon Polyurethane Industry Co., Ltd., product name: "Coronate L") and toluene were added to prepare a 50%-base polymer composition (6).

The resultant polymer composition (6) was applied onto a polyester release film subjected to silicone release treatment (manufactured by Du Pont-Toray Co., Ltd., product name: "Cerapeel MDA") so as to have a thickness of 80 μm after drying. Thus, a resin sheet (14) was obtained.

The resultant resin sheet (14) was dried under a reduced pressure of −100 kPa at 200° ° C. for 24 hours. After that, the polyester release film was peeled from the resin sheet (14), and the resultant resin sheet (14') was subjected to the evaluations (1) to (5). The results are shown in Table 1.

Comparative Example 2

The resin composition (1) containing the acrylic copolymer (1) was obtained in the same manner as in Example 1. To the resin composition (1) containing 100 parts by weight of the acrylic copolymer (1), 2 parts by weight of an isocyanate-based cross-linking agent (manufactured by Nippon Polyurethane Industry Co., Ltd., product name: "Coronate L"), toluene, and 250 parts by weight of gas adsorbent particles each formed of a Ca-ion-exchanged A-type zeolite (particle diameter: 10 μm or less) serving as gas adsorbent particles were added to prepare a 50%-base composition (7) for gas adsorption layer formation.

The resultant composition (7) for gas adsorption layer formation was applied onto a polyester release film subjected to silicone release treatment (manufactured by Toray Advanced Film Co., Ltd., product name: "Cerapeel MDA") so as to have a thickness of 80 μm after drying, to thereby form a gas adsorption layer. Then, the polyester release film was peeled off to provide a gas adsorption sheet (15). The resultant gas adsorption sheet (15) was dried under a reduced pressure of −100 kPa at 200° ° C. for 24 hours, and then subjected to the evaluations (1) to (5). The results are shown in Table 1.

Comparative Example 3

The polymer composition (6) was prepared in the same manner as in Comparative Example 1.

The resultant polymer composition (6) was applied onto a polyimide film (manufactured by Du Pont-Toray Co., Ltd., product name: "Kapton 100H", thickness: 25 μm) serving as a heat-resistant base material so as to have a thickness of 80 μm after drying. Thus, a resin sheet (16) was obtained.

The resultant resin sheet (16) was dried under a reduced pressure of −100 kPa at 200° ° C. for 24 hours, and then subjected to the evaluations (1) to (5). The results are shown in Table 1.

Reference Example 1

The gas adsorption sheet (1) was obtained in the same manner as in Example 1.

The resultant gas adsorption sheet was subjected to the gas adsorption amount evaluation without being subjected to high-temperature drying under reduced pressure, and the result was unacceptable.

TABLE 1

| | | | | Example 1 | Example 2 | Example 3 | Example 4 | Example 5 | Example 6 | Example 7 |
|---|---|---|---|---|---|---|---|---|---|---|
| Gas adsorption layer | | Thickness (μm) | | 80 | 80 | 80 | 80 | 80 | 120 | 120 |
| | Composition (part(s)) | Binder resin | Acrylic copolymer (1) | 100 | 100 | 100 | — | — | — | — |
| | | | Acrylic copolymer (2) | — | — | — | — | — | — | — |
| | | | Acrylic copolymer (3) | — | — | — | 100 | 100 | 100 | 100 |
| | | | Acrylic copolymer (4) | — | — | — | — | — | — | — |
| | | | Polyisobutylene | — | — | — | — | — | — | — |
| | | Cross-linking agent | Coronate L | 2 | 2 | 2 | 2 | 2 | 3 | 3 |
| | | | TETRAD-C | — | — | — | — | — | — | — |
| | | Gas adsorbent particles | Ca-ion-exchanged A-type zeolite | 900 | 900 | 250 | 900 | 250 | 900 | 900 |
| Base material | | Thickness (μm) | | 25 | 25 | 25 | 25 | 25 | 25 | 12 |
| Pressure-sensitive adhesive layer | | Thickness (μm) | | — | 10 | — | — | — | — | — |
| | Composition (part(s)) | | Acrylic copolymer (2) | — | 100 | — | — | — | — | — |
| | | | Coronate L | — | 2 | — | — | — | — | — |
| Evaluation | | Gas adsorption amount (mL/g) | | 40 | 40 | 20 | 38 | 18 | 22 | 25 |
| | | Heat resistance | | ○ | ○ | ○ | ○ | ○ | ○ | ○ |
| | | Handleability | | ○ | ○ | ○ | ○ | ○ | ○ | ○ |

TABLE 1-continued

|  | | | | | | | | |
|---|---|---|---|---|---|---|---|---|
| Electrolytic solution resistance | | ○ | ○ | x | ○ | ○ | ○ | ○ |
| Gas permeability cm³/(m² · 24 hrs · atm) | | 5,300 | 5,300 | 5,300 | 4,500 | 4,500 | 3,100 | 3,100 |

| | | | | Example 8 | Example 9 | Example 10 | Example 11 | Example 12 | Example 13 |
|---|---|---|---|---|---|---|---|---|---|
| Gas adsorption layer | Composition (part(s)) | Thickness (μm) | | 80 | 80 | 80 | 80 | 80 | 80 |
| | | Binder resin | Acrylic copolymer (1) | — | — | — | — | — | — |
| | | | Acrylic copolymer (2) | 100 | — | — | — | — | — |
| | | | Acrylic copolymer (3) | — | — | — | 100 | 100 | — |
| | | | Acrylic copolymer (4) | — | — | — | — | — | 100 |
| | | | Polyisobutylene | — | 100 | 100 | — | — | — |
| | | Cross-linking agent | Coronate L | — | — | — | 2 | 2 | 2 |
| | | | TETRAD-C | 0.5 | — | — | — | — | — |
| | | Gas adsorbent particles | Ca-ion-exchanged A-type zeolite | 250 | 900 | 250 | 10 | 2,000 | 250 |
| Base material | | Thickness (μm) | | 25 | 25 | 25 | 25 | 25 | 25 |
| Pressure-sensitive adhesive layer | | Thickness (μm) | | — | — | — | — | — | — |
| | Composition (part(s)) | Acrylic copolymer (2) | | — | — | — | — | — | — |
| | | Coronate L | | — | — | — | — | — | — |
| Evaluation | | Gas adsorption amount | | 24 | 35 | 15 | 5 | 50 | 21 |
| | | Heat resistance | | ○ | ○ | ○ | ○ | ○ | ○ |
| | | Handleability | | ○ | ○ | ○ | ○ | ○ | ○ |
| | | Electrolytic solution resistance | | ○ | ○ | ○ | ○ | ○ | x |
| | | Gas permeability cm³/(m² · 24 hrs · atm) | | 6,400 | 2,300 | 2,300 | 4,500 | 4,500 | 5,800 |

| | | | | Comparative Example 1 | Comparative Example 2 | Comparative Example 3 |
|---|---|---|---|---|---|---|
| Gas adsorption layer | Composition (part(s)) | Thickness (μm) | | 80 | 80 | 80 |
| | | Binder resin | Acrylic copolymer (1) | 100 | 100 | 100 |
| | | | Acrylic copolymer (2) | — | — | — |
| | | | Acrylic copolymer (3) | — | — | — |
| | | | Acrylic copolymer (4) | — | — | — |
| | | | Polyisobutylene | — | — | — |
| | | Cross-linking agent | Coronate L | 2 | 2 | 2 |
| | | | TETRAD-C | — | — | — |
| | | Gas adsorbent particles | Ca-ion-exchanged A-type zeolite | — | 250 | — |
| Base material | | Thickness (μm) | | — | — | 25 |
| Pressure-sensitive adhesive layer | | Thickness (μm) | | — | — | — |
| | Composition (part(s)) | Acrylic copolymer (2) | | — | — | — |
| | | Coronate L | | — | — | — |
| Evaluation | | Gas adsorption amount | | 0 | 15 | 0 |
| | | Heat resistance | | x | x | ○ |
| | | Handleability | | x | x | ○ |
| | | Electrolytic solution resistance | | ○ | ○ | ○ |
| | | Gas permeability cm³/(m² · 24 hrs · atm) | | 5,300 | 5,300 | 5,300 |

INDUSTRIAL APPLICABILITY

The gas adsorption sheet of the present invention can be suitably used as a gas adsorption material for a nonaqueous secondary battery.

REFERENCE SIGNS LIST

10 heat-resistant base material
20 gas adsorption layer
30 pressure-sensitive adhesive layer
100, 200, 300 gas adsorption sheet

The invention claimed is:
1. A gas adsorption sheet for a secondary battery, comprising:
   a heat-resistant base material; and
   a gas adsorption layer arranged on at least one surface of the heat-resistant base material,
   wherein the gas adsorption layer contains:
     an acrylic resin; and
     gas adsorbent particles each of which is formed of an inorganic porous material having pores, and is capable of adsorbing a gas,
   wherein the acrylic resin contains a constituent unit derived from a (meth)acrylic acid alkyl ester, wherein the (meth)acrylic acid alkyl ester has a linear or branched alkyl group having 4 to 12 carbon atoms, wherein a content of a constituent unit derived from a (meth)acrylic acid alkyl ester having a branched alkyl group in the acrylic resin is from 20 parts by weight to 100 parts by weight with respect to 100 parts by weight of the constituent unit derived from the (meth)acrylic acid alkyl ester, and wherein a material for forming the heat-resistant base material is polyamide imide, polyetherimide, polyphenylene sulfide, polyethylene naphthalate, polyimide, or polyetheretherketone.

2. The gas adsorption sheet for a secondary battery according to claim 1, wherein a content of the gas adsorbent particles is from 10 parts by weight to 90 parts by weight with respect to 100 parts by weight of the gas adsorption sheet for a secondary battery.

* * * * *